US012230892B2

(12) United States Patent
Chen

(10) Patent No.: US 12,230,892 B2
(45) Date of Patent: Feb. 18, 2025

(54) ELECTRONIC DEVICE

(71) Applicant: PanelSemi Corporation, New Taipei (TW)

(72) Inventor: Hsien-Te Chen, Taipei (TW)

(73) Assignee: PANELSEMI CORPORATION, New Taipei (TW)

( * ) Notice: Subject to any disclaimer, the term of this patent is extended or adjusted under 35 U.S.C. 154(b) by 99 days.

(21) Appl. No.: 18/145,697

(22) Filed: Dec. 22, 2022

(65) Prior Publication Data

US 2023/0198146 A1 Jun. 22, 2023

Related U.S. Application Data

(60) Provisional application No. 63/292,803, filed on Dec. 22, 2021.

(51) Int. Cl.
*H01Q 3/36* (2006.01)
*H01Q 3/26* (2006.01)

(52) U.S. Cl.
CPC ............... *H01Q 3/36* (2013.01); *H01Q 3/267* (2013.01)

(58) Field of Classification Search
CPC ........... H01Q 3/36; H01Q 3/267; H01Q 3/40; H01Q 21/0075
See application file for complete search history.

(56) References Cited

U.S. PATENT DOCUMENTS

2008/0079649 A1 * 4/2008 Mohamadi ........... H01Q 21/062 343/700 MS
2015/0214615 A1 * 7/2015 Patel ...................... H01Q 3/443 342/372

FOREIGN PATENT DOCUMENTS

CA 2646840 A1 * 7/2009 ........... H04B 1/0458
CN 115693172 A * 2/2023 ............. H01Q 15/14

* cited by examiner

*Primary Examiner* — Hoang V Nguyen
(74) *Attorney, Agent, or Firm* — MUNCY, GEISSLER, OLDS & LOWE, P.C.

(57) ABSTRACT

An electronic device includes a substrate, plural varactors, a memory element, a driving unit and plural antenna elements. Each varactor is defined with a capacitor-voltage characteristic curve. The memory element is defined with one or more lookup tables for recording the capacitance values and varactor voltage values of the capacitor-voltage characteristic curve. The driving unit outputs plural voltage signals respectively to the varactors, and each voltage signal respectively provided with one varactor voltage value. Each antenna element is provided with various phase values in response to the capacitance values of the corresponding varactor. A selective one of the varactor voltage values in response to the required capacitance value of the corresponding varactor is found out from the lookup table(s) and delivered by the driving unit. The antenna elements are together enabled to form a wave beam with a characteristic wavefront in accordance with the capacitance values.

12 Claims, 2 Drawing Sheets

ELECTRONIC DEVICE

CROSS REFERENCE TO RELATED APPLICATIONS

The non-provisional patent application claims priority to U.S. provisional patent application with Ser. No. 63/292,803 filed on Dec. 22, 2021. This and all other extrinsic materials discussed herein are incorporated by reference in their entirety.

BACKGROUND

Technology Field

The disclosure relates to an electronic device.

Description of Related Art

Antennas for mobile communications or satellite broadcasting need to have the function of changing the beam direction (called beam scanning or beam steering). An antenna with this function can be called a scanned antenna. One of the commonly used scanning antennas is, for example, a phased array antenna, which includes a plural of antenna elements.

The existing phased array antenna uses the input voltage to control the capacitance value of a varactor (variable capacitor), thereby determining the phase angle of the wavefront of microwave so as to change the direction of microwave transmission or reception.

However, due to process variations or other factors, there are some variations exist between the capacitor-voltage characteristic curves of the varactors in the same specification. In other words, the capacitor-voltage characteristic curves of different varactors in the same specification can have offsets. Therefore, when the same voltage is input to two varactors in the same specification, they will generate two different capacitance values. When the varactors with this phenomenon are applied to a phased array antenna, the phase angle of the wavefront will have offsets, and the intensity of the transmitted signal will be weakened.

SUMMARY

This disclosure provides an electronic device capable of improving beamforming.

One or more exemplary embodiments of the present disclosure provide a beamforming method of an electronic device, comprising: providing a plurality of capacitor-voltage characteristic curves of a plurality of varactors, wherein each of capacitor-voltage characteristic curves of a corresponding one of the varactors is provided with a plurality of capacitance values in response to a plurality of varactor voltage values, the capacitance values and the varactor voltage values are recorded in one or more lookup tables in a memory element; determining a phase value of each of a plurality of antenna elements according to a characteristic wavefront, wherein the antenna elements are provided to correspond to the varactors, and each of the antenna elements varies with the phase values in response to the capacitance values of a corresponding one of the varactors; calculating to get a required one of the capacitance values in response to a required one of the phase values of each of the antenna elements; finding out a selective one of the varactor voltage values in response to the required one of the capacitance values of a corresponding one of the varactors, which is in relative with each of the antenna elements in one or ones of the lookup tables in the memory element; and providing a voltage signal with the selective one of the varactor voltage values to the corresponding one of the varactors, whereby the antenna elements are together enabled to form a wave beam with the characteristic wavefront.

In one exemplary embodiment, the beamforming method further includes: preparing a substrate; and before or after the step of providing a plurality of capacitor-voltage characteristic curves of a plurality of varactors, the varactors being arranged on the substrate.

In one exemplary embodiment, after the step of providing a plurality of capacitor-voltage characteristic curves of a plurality of varactors, the beamforming method further includes: arranging the varactors on the substrate; and providing a plurality of antenna signals to travel through the antenna elements each of the antenna signals defines a signal frequency, in which a frequency value thereof is equal to or greater than 1 GHz.

In one exemplary embodiment, before the step of providing a plurality of capacitor-voltage characteristic curves of a plurality of varactors, the beamforming method further includes: arranging the varactors on the substrate; wherein one or ones of the varactors is a testing varactor, the testing varactor is provided with ones of the capacitance values in response to various ones of the voltage signals.

In one exemplary embodiment, before the step of providing a plural of capacitor-voltage characteristic curves of a plural of varactors, the beamforming method further includes: arranging the varactors on the substrate; wherein one or ones of the varactors is a testing varactor, the testing varactor is provided with ones of the capacitance values in response to various ones of the voltage signals.

In one exemplary embodiment, the step of preparing a substrate further includes: connecting the memory element to the substrate.

In one exemplary embodiment, before or after the step of providing a plurality of capacitor-voltage characteristic curves of a plurality of varactors, the beamforming method includes: providing a plurality of low noise amplifying circuits and power amplifying circuits; wherein each of the low noise amplifying circuits and power amplifying circuits is provided with the power values in response to the varactor voltage values; and storing the power values and the varactor voltage values in response thereto corresponding to each of the low noise amplifying circuits and power amplifying circuits in one or ones of the lookup tables in the memory element.

In one exemplary embodiment, each of the low noise amplifying circuits and power amplifying circuits defines a plurality of signal pins being provided with the power values in response to the varactor voltage values, which are recorded in one or ones of the lookup tables in the memory element.

In one exemplary embodiment, each of the antenna elements corresponds to one or ones of the varactors, each of the antenna elements varies with the phase values in response to the capacitance values of a corresponding one or ones of the varactors.

In one exemplary embodiment, one or ones of the lookup tables in one or ones of memory elements.

One or more exemplary embodiments of the present disclosure provide an electronic device, which includes a substrate; a plurality of varactors arranged on the substrate; each of the varactors is provided with a plurality of capacitance values in response to a plurality of varactor voltage values and defined with a capacitor-voltage characteristic curve; a memory element is defined with one or more lookup tables, wherein the capacitance values and the varactor voltage values of the capacitor-voltage characteristic curve are recorded in the lookup table(s); a driving unit outputting a plurality of voltage signals respectively to the varactors, and each of the voltage signals respectively provided with one of the varactor voltage values; and a plurality of antenna elements arranged on the substrate and electrically connected to the varactors; each of the antenna elements being provided with various phase values in response to the capacitance values of a corresponding one of the varactors. A selective one of the varactor voltage values in response to the required one of the capacitance values of a corresponding one of the varactors is found out from one or ones of the lookup table(s) and delivered by the driving unit; whereby the antenna elements are together enabled to form a wave beam with a characteristic wavefront in accordance with the capacitance values.

In one exemplary embodiment, the memory element connects to the substrate.

In one exemplary embodiment, the electronic device further defines a plurality of antenna signals traveling through the antenna elements; wherein each of the antenna signals defines a signal frequency, in which a frequency value thereof is equal to or greater than 1 GHz.

In one exemplary embodiment, one or ones of the varactors is a testing varactor, and the testing varactor is provided with ones of the capacitance values in response to various ones of the voltage signals.

In one exemplary embodiment, the electronic device further includes a plurality of low noise amplifying circuits and power amplifying circuits; wherein each of the low noise amplifying circuits and power amplifying circuits is provided with the power values in response to the varactor voltage values, which are recorded in ones of the lookup tables in the memory element.

In one exemplary embodiment, each of the low noise amplifying circuits and power amplifying circuits includes a plurality of signal pins being provided with the power values in response to the varactor voltage values, which are recorded in one or ones of the lookup tables in the memory element.

In one exemplary embodiment, each of the antenna elements corresponds to one or ones of the varactors, each of the antenna elements varies with the phase values in response to the capacitance values of a corresponding one or ones of the varactors.

One or more exemplary embodiments of the present disclosure provide an electronic device, which includes a substrate, a plurality of varactors arranged on the substrate, a memory element is defined with one or more lookup tables and a driving unit. Each of the varactors is provided with a plurality of capacitance values in response to a plurality of varactor voltage values in a respective manner. Each of the lookup tables records a plurality of voltage values, in which each of the voltage values is functioned of the varactor voltage, and the varactor voltage is function of the capacitance values. The driving unit outputs a plurality of voltage signals respectively in response with the voltage values. A selective one of the voltage values is found out from one or ones of the lookup table(s) and delivered by the driving unit and enables a wave beam with a characteristic wavefront in accordance with the voltage values.

In one exemplary embodiment, the memory element directly connects to the substrate.

In one exemplary embodiment, the electronic device further includes a plurality of antenna elements arranged on the substrate and electrically connected to the varactors, wherein each of the antenna elements being provided with various phase values in response to one of the voltage values, and the selective one of the voltage values is in response to the required one of the phase values of the antenna elements.

In one exemplary embodiment, the electronic device further defines a plurality of antenna signals traveling through the antenna elements; wherein each of the antenna signals defines a signal frequency, in which a frequency value thereof is equal to or greater than 1 GHz.

In one exemplary embodiment, the electronic device further includes a plurality of low noise amplifying circuits and power amplifying circuits, and the voltage values is further functioned of the low noise amplifying circuits and power amplifying circuits.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1:
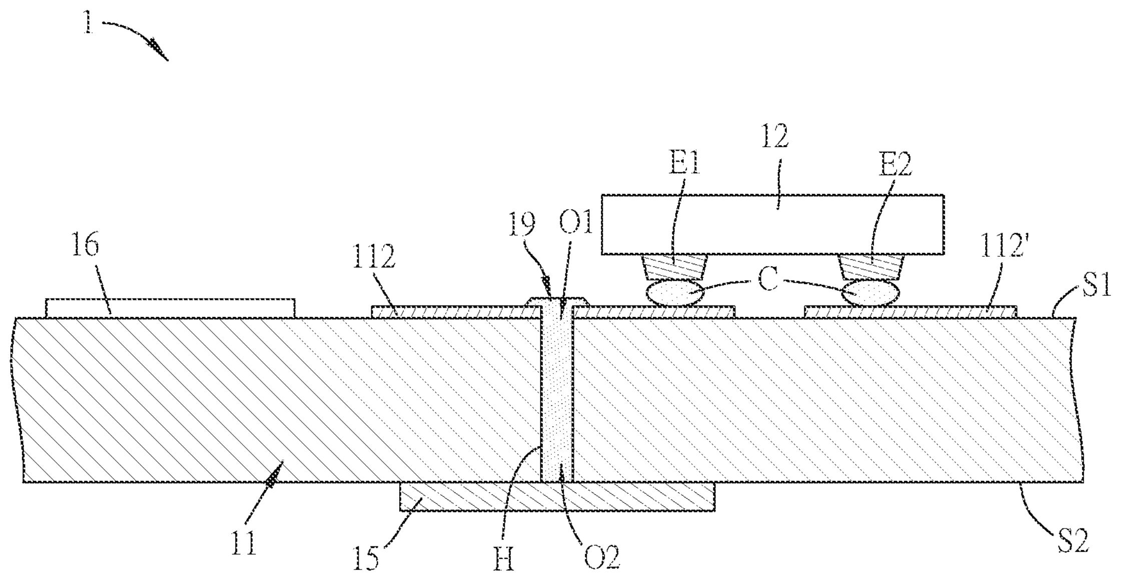
FIG. 1 is a schematic partial sectional view of an electronic device according to an embodiment of this disclosure.
Figure 2:
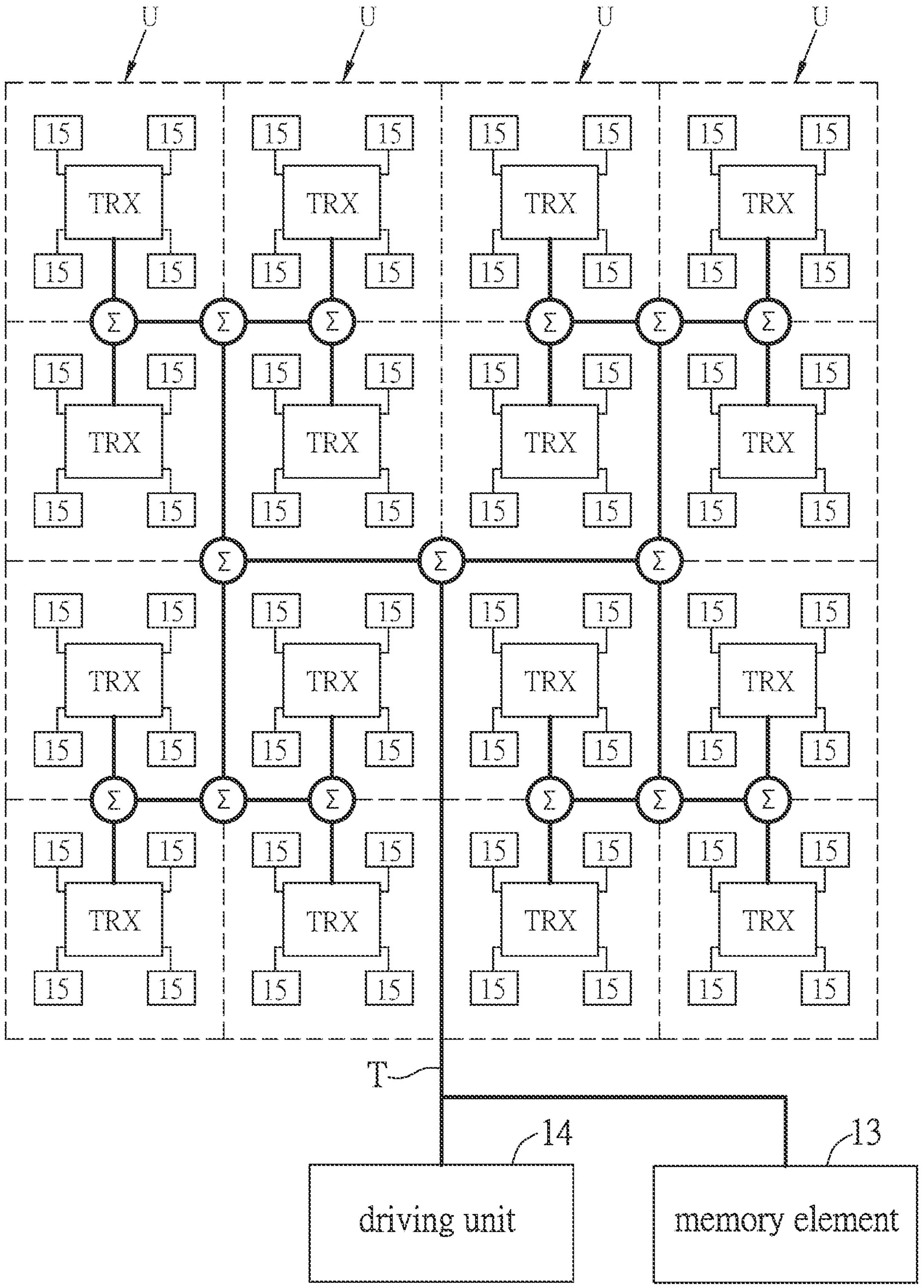
FIG. 2 is a functional block diagram of an electronic device according to an embodiment of this disclosure.

FIG. 1 is a schematic partial sectional view of an electronic device according to an embodiment of this disclosure, and FIG. 2 is a functional block diagram of an electronic device according to an embodiment of this disclosure. Herein, FIG. 1 only shows, for example, one varactor 12 being arranged on the upper surface (S1) of the substrate 11.

Referring to FIG. 1 and FIG. 2, the electronic device 1 includes a substrate 11, a plurality of varactors 12, at least one memory element 13, a driving unit 14 and a plurality of antenna elements 15.

The substrate 11 can be a rigid substrate, a semi-rigid substrate, a resilient substrate, or a composition of at least one rigid substrate and at least one resilient substrate. The resilient substrate can include a PI material, or the PI material having an adhesion layer attached thereto. In one case, the substrate 11 includes a rigid board, a resilient board, and an adhesive layer for bonding the rigid board and the resilient board. The substrate 11 is capable of glass, PTFE, ceramic, PI material, or any composition thereof, or other materials. The combined thickness of the adhesive layer and the resilient board can be less than or equal to 60 μm. To be understood, when the thickness of the resilient board increases, the physical properties thereof can approach that of the rigid board.

The substrate 11 includes a substrate body 111, and a conductive pattern 112 electrically connecting with the antenna elements 15. The substrate body 111 is defined with two surfaces S1 and S2 opposite to each other (i.e., the upper surface and the lower surface), and the conductive pattern 112 are formed on the surface S1. To be noted, the antenna element 15, here in this invention, is substantially a metal layer that functioned as an antenna and could be elaborated as an antenna patch as well; the converge where the circuitry or elements for driving the antenna element 15, or the equivalence could be also defined as an antenna unit. In this case, electrical connection between the conductive pattern 112 and the antenna elements 15 is accomplished by a plurality of through holes H with a plurality of conductive structure 19, but not limited thereto. Each of the through hole H penetrates through the substrate body 111, communicates the surfaces S1 and S2 of the substrate body 111, and is arranged close to the conductive pattern 112. In this embodiment, the substrate body 111 is defined with two openings O1 and O2 corresponding to each through hole H, wherein the opening O1 corresponds to the surface S1, and the opening O2 corresponds to the surface S2. In some embodiments, the sizes of the opening O1 and the opening O2 can be the same or different. In addition, each through hole H is defined with a diameter, which can be the minimum diameter of the through hole H such as, for example but not limited to, 75 μm. In addition, the diameter of the through hole H can be greater than or equal to 35 μm. For example, the diameter of the through hole His 75 μm, 50 μm, 35 μm, 25 μm, 15 μm, or 10 μm. Herein, the through hole H can have a uniform diameter (i.e., the through hole H has one diameter value); or the diameter of the through hole H is not uniform (e.g. the through hole H has a narrower middle portion and wider top and bottom portions, or the through hole H is gradually wider from bottom to top or from top to bottom). In addition, each through hole H can be further defined with a depth-to-diameter aspect ratio (the ratio of the depth of the through hole H to the diameter of the through hole H). The depth-to-diameter aspect ratio of each through hole H can be less than or equal to 50 and greater than or equal to 3. The depth of each through hole H can be realized as the thickness of the substrate body 111. For example, when the substrate body 111 has a uniform thickness, the depths of all through holes H are equal to the thickness of the substrate body 111. Otherwise, when the substrate body 111 does not have a uniform thickness, the depths of all through holes H are different values. In some embodiments, the through holes H can be formed by, for example, laser drilling. In some embodiments, a plurality of conductive structures 19 are placed in the through holes H for electrically connecting the components arranged on the surface S1 to the components arranged on the surface S2. FIG. 1 shows that one conductive structure 19 penetrates through the substrate 11 and is placed in the through hole H of the substrate 11, and one end of the conductive structure 19 is connected to the conductive pattern 112. Accordingly, the conductive pattern 112 arranged on the upper surface (S1) can electrically connect the lower surface (S2) of the substrate 11 via the conductive structure 19 located in the through hole H, so that the signals can be transmitted from the conductive pattern 112 on the upper surface (S1) to the lower surface (S2) of the substrate 11 through the conductive structure 19 in the through hole H, and vice versa. In some embodiments, the conductive structure 19 can be a conductive pin or a conductive element formed by solidifying the conductive material such as, for example but not limited to, a metal material (e.g. gold, silver, copper, aluminum, iron, nickel, or cobalt), or an alloy formed by at least one of the foregoing materials. This disclosure is not limited thereto. In some embodiments, when the conductive structure 19 is conductive pin, it can be a countersunk head conductive structure. To be noted, the electrical connection between the conductive pattern 112 and the antenna elements 15 can be accomplished by another approaches, such as by an extension board, by side wiring, or approaches the like.

In this embodiment, for example, the substrate body 111 is a rigid substrate, which is made of glass or Polytetrafluoroethylene (PTFE) material, for example. The substrate body 111 can define a thickness, which can be, for example but not limited to, less than or equal to 1.1 mm, and greater than or equal to 0.01 mm. For example, the thickness of the substrate body 111 can be 1.1 mm, 0.5 mm, or 0.01 mm. The combined thickness of the adhesive layer and the resilient board can be less than or equal to 60 μm. For example, but not limited thereto, the thickness of the adhesive layer can be 35 μm, and the thickness of the resilient board can be 15 μm. The substrate body 111 usually has a uniform thickness, but this disclosure is not limited thereto. When the substrate body 111 has a non-uniform thickness, the defined thickness can be the minimum thickness of the entire substrate body 111.

For example, the conductive pattern 112 can be a thin-film pattern formed by a thin-film process. The conductive pattern 112 can be used to transmit electrical signals, for example, low-frequency signals, but not limited. The material of the conductive pattern 112 can include, for example, metals (e.g. gold, silver, copper or aluminum), or any combination of the mentioned metals, or an alloy of any of their combinations, or any of other conductive materials.

A plurality of varactors 12 are arranged on the surface S1 of the substrate body 111 and electrically connected to the corresponding conductive pattern 112. The plurality of antenna elements 15 are respectively planar antennas, which are arranged on the surface S2 of the substrate 11 and electrically connected to the corresponding one or ones of the varactors 12. In some cases, each of the antenna elements 15 corresponds to one varactor 12; in some cases, each of the antenna elements 15 corresponds to ones of the varactors 12, for example, the varactors 12 are arranged in the manner of a serial connection, a parallel connection, or a combination thereof. This disclosure is not limited thereto. In some embodiments, the shape of the antenna element 15 can be polygon (e.g. quadrilateral), circle, ellipse, sector or ring, and this disclosure is not limited thereto. Herein, each antenna element 15 covers the opening O2 of the corresponding through hole H, contacts and electrically connects the corresponding conductive structure 19, and is electrically connected to the corresponding varactor 12 through the corresponding conductive structure 19. In different embodiments, each antenna element 15 may not cover the opening O2 of the corresponding through hole H, as long as it is electrically connected to the corresponding conductive structure 19 through, for example, a conductive layer. Therefore, each varactor 12 can transmit electrical signals from the conductive pattern 112 to the corresponding antenna element 15 via the corresponding conductive structure 19. Specifically, a signal end E1 of the varactor 12 is electrically connected to the conductive pattern 112 of the substrate 11, and the other signal end E2 of the varactor 12 is electrically connected to a pad extending from a ground layer. In some embodiments, the ground layer could be a ground layer 112' can be a part of the conductive pattern 112. In some cases, the ground layer is provided on the first surface of the substrate 11; in some cases, the ground layer is provided between the multiple boards, while the substrate 11 includes multiple boards; in some other cases, the ground layer is provided to where other than ways mentioned above as long as electrical function is offered.

In some embodiments, the varactor 12 includes at least one signal end E1 or at least one signal end E2 (one or more signal ends E1 or/and E2). For example, the varactor 12 as shown in FIG. 1 has one signal end E1 and one signal end E2. The signal ends E1 and E2 can be the leads or pins (electrodes) of the varactor 12. In some embodiments, the varactor 12 is, for example, a surface mounted device (SMD), but this disclosure is not limited thereto. Herein, by utilizing surface mount technology (SMT), the signal end E1 can be electrically connected to the conductive pattern 112 of the substrate 11, and the signal end E2 can be electrically connected to where electrically connecting the ground layer. Herein, a conductive element C can be provided between the signal end E1 and the conductive pattern 112, or/and another conductive element C can be provided therebetween. The material of the conductive element C includes, for example, tin, gold, copper or silver, or an alloy or eutectic compound of any of the above materials, or any of other conductive metal materials, and this disclosure is not limited thereto. In some embodiments, the signal ends E1 and E2 of the varactor 12 can be eutectic connected to the conductive pattern 112 by high-temperature thermal fusion (e.g. laser ablation), and the materials thereof can refer to the above embodiments. In some embodiments, the conductive elements C can be omitted, and the electrical connection is approached by laser welding or the like.

In this embodiment, the varactor 12 can be a varactor diode chip. In some embodiments, the varactor 12 can include an RF diode chip, such as, for example but not limited to, a GaAs-Based, a GaN-Based, or an InP-Based RF diode chip. In some embodiments, the varactors 12 can be arranged in an array such as, for example but not limited to, a rectangular array or a circular array, or the like, for corresponding to the rectangular field type, the circular field type, or any of other field types, or for applying to any of different types of substrate 11 or antenna element 15, and this disclosure is not limited thereto.

The electronic device 1 of this embodiment is an AM (active-matrix) electronic device, so that a plurality of driving elements 16 are correspondingly and electrically connected to the varactors 12, respectively. Each driving element 16 can be, for example, a TFT, a driving chip or a driving chiplet, which is configured to drive (e.g. switch or turn on/off) the corresponding varactor 12.

Referring to FIG. 2, the electronic device as shown in FIG. 2 includes, for example, 16 circuit units U (4*4). Each circuit unit U includes a transceiver unit TRX (e.g. a transceiver chip), and one transceiver unit TRX can drive four corresponding antenna elements 15. Therefore, one transceiver unit TRX can transmit signals through four antenna elements 15: or the signals received by four antenna elements 15 can be transmitted to the corresponding one of the transceiver units TRX. To be noted, the amount of the circuit units U and the amount of the antenna elements corresponding to one transceiver unit TRX are not limited to the above example, and the transceiver unit TRX is defined to include electric components, with various or same types or quantity, for example but not limited. In practice, the amount of the circuit units U and the amount of the antenna elements corresponding to one transceiver unit TRX can be determined based on the requirements. In the embodiment of FIG. 2, each transceiver unit TRX includes four varactors 12, or 4$x$ varactors 12. In addition, the conductive pattern 112 of this embodiment further includes a power distribution circuit T, and the driving unit 14 can be electrically connected to the transceiver units TRX of each circuit unit U through the power distribution circuit T, thereby evenly distributing the output power to the circuit units U and the corresponding antenna elements 15.

Based on different input varactor voltage values, each varactor 12 can provide various capacitance values corresponding to the varactor voltage values, and thus each varactor 12 can define a capacitor-voltage characteristic curve. In other words, each varactor 12 has one corresponding capacitor-voltage characteristic curve, and the capacitor-voltage characteristic curve of each varactor 12 contains a plurality of capacitance values of the varactor 12 corresponding to multiple different varactor voltage values.

Referring to the following table 1, it is one lookup table obtained based on the capacitor-voltage characteristic curve of one varactor 12. Herein, V1~Vn represent different varactor voltage values, and C1~Cn represent the capacitance values corresponding to the varactor voltage values V1~Vn, respectively. Accordingly, for one individual varactor 12, if the varactor voltage value is known, the corresponding capacitance value of this varactor 12 can be obtained based on the capacitor-voltage characteristic curve or the lookup table. Similarly, if the capacitance value of the varactor 12 is known, the corresponding varactor voltage value can be obtained based on the capacitor-voltage characteristic curve or the lookup table.

TABLE 1

| | |
|---|---|
| V1 | C1 |
| V2 | C2 |
| V3 | C3 |
| . | . |
| . | . |
| . | . |
| Vn-1 | Cn-1 |
| Vn | Cn |

The one or more lookup tables contain the capacitor-voltage characteristic curves of the varactors 12, and one or more memory elements 13 store the one or more lookup tables. Specifically, in order to improve the offset phenomenon of the capacitor-voltage characteristic curves of different varactors in the same specification caused by process variations or other factors, the manufactured varactors 12 can be measured to obtain the capacitor-voltage characteristic curves for different varactors 12. Afterwards, for each varactor 12, a plural of capacitance values correspond to different varactor voltage values can be obtained based on the corresponding capacitor-voltage characteristic curve, and then these varactor voltage values and the corresponding capacitance values are recorded in one or more lookup tables recorded in the memory element 13. In the following application, the needed information can be obtained from the lookup table recorded in the memory element 13.

The driving unit 14 can output a plurality of voltage signals to these varactors 12. Herein, each voltage signal contains a varactor voltage value, and each antenna element 15 can have different phase values based on the various capacitance values of the corresponding varactor 12. In this case, the driving unit 14 applies a voltage signal to the corresponding varactor 12, and then the capacitance value of the varactor 12 can be obtained from the lookup table based on the selective varactor voltage value (i.e., obtaining the capacitance value corresponding to the selective varactor voltage value). After obtaining the corresponding capacitance values of the varactors 12 from the lookup table(s) based on the selective varactor voltage values, the antenna elements 15 can together form a wave beam with the characteristic wavefront according to the obtained capacitance values, thereby tracking the satellite with high precision and resolution.

In some embodiments, one or ones of the varactors 12 are testing varactors. The testing varactor is provided with various voltage signals so as to obtain the corresponding capacitance values. In some embodiments, the driving unit 14 outputs a plurality of antenna signals (voltage signals) to the antenna elements 15, wherein the signal frequencies of these antenna signals are equal to or greater than 1 GHz. In some embodiments, the quantity of the memory element 13 is multiple. In some embodiments, the memory element 13, the varactors 12, the driving units 14, the antenna elements 15 can be all arranged on the substrate 11, and the various capacitance values corresponding to different varactor voltage values can be obtained by the substrate 11, or an extension board thereof. In some embodiments, the memory element(s) 13 can be arranged at another device other than the place on the substrate 11, so as to provide wireless communication. For example, the memory element 13 can be arranged on a control board in addition to the substrate 11, and the control board can be, for example but not limited to, a flexible circuit board (e.g. COF) and connected to the substrate 11, wherein the various capacitance values corresponding to different varactor voltage values can be obtain by wireless transmission (or wired transmission).

In some embodiments, the electronic device 1 further includes a plurality of low noise amplifying circuits (LNA) and a plurality of power amplifying circuits (PA). Each of the low noise amplifying circuits and power amplifying circuits can provide the power values in response to the varactor voltage values. Herein, at least some of the lookup tables can also record the varactor voltage values and the power values of each of the low noise amplifying circuits and power amplifying circuits in response each other. In some embodiments, each of the low noise amplifying circuits and power amplifying circuits includes a plurality of signal pins, and the power values in response to the varactor voltage values for each of the signal pins can also be recorded in a part of the lookup tables in the memory element 13. In other words, the lookup tables of the memory element 13 can further store the relationship between the power values and the varactor voltage values for the low noise amplifying circuits and power amplifying circuits, which are required for each antenna element 15.

This disclosure also provides a beamforming method of an electronic device, which includes the following steps 1 to 4.

The step 1 is to provide a plurality of capacitor-voltage characteristic curves of a plurality of varactors 12, wherein each of capacitor-voltage characteristic curves of a corresponding one of the varactors 12 is provided with a plurality of capacitance values in response to a plurality of varactor voltage values, and the capacitance values and the varactor voltage values are recorded in one or more lookup tables in the memory element 13.

In some embodiments, the beamforming method of an electronic device further includes: preparing a substrate 11; and before or after the step of providing a plurality of capacitor-voltage characteristic curves of a plurality of varactors 12, arranging the varactors 12 on the substrate 11. In other words, before distributing the varactors 12 on the substrate 11, different varactor voltage values are applied to each varactor 12 so as to obtain the capacitance values corresponding to different varactor voltage values, thereby obtaining the information of capacitor-voltage characteristic curve. Then, the varactors 12 are distributed on the substrate 11. In another embodiment, after distributing the varactors 12 on the substrate 11, different varactor voltage values are applied to each varactor 12 so as to obtain the capacitance values corresponding to different varactor voltage values, thereby obtaining the information of capacitor-voltage characteristic curve. This disclosure is not limited thereto.

In some embodiments, after the step of obtaining a plurality of capacitor-voltage characteristic curves of the varactors 12, the beamforming method of an electronic device further includes: arranging the varactors 12 on the substrate 11; and providing a plurality of antenna signals to traveling through the antenna elements 15; wherein the signal frequency of each antenna signal has a frequency value equal to or greater than 1 GHz (high-frequency signal). In some embodiments, before the step of obtaining a plurality of capacitor-voltage characteristic curves of the varactors 12, the beamforming method of an electronic device further includes: arranging the varactors 12 on the substrate 11; wherein one of the varactors 12 is a testing varactor (i.e., a low frequency capacitor), the testing varactor is applied with different voltage signals (i.e., low frequency signals) so as to obtain the corresponding capacitance values.

In some embodiment, in the step of preparing the substrate 11, the memory element 13 is arranged on, for example, a flexible circuit board instead of the substrate 11, and the flexible circuit board is connected to the substrate 11.

In addition, the step 2 is to determine a phase value of each of a plurality of antenna elements 15 according to a characteristic wavefront; and to calculate to get a required capacitance value in response to a corresponding phase value of each antenna element 15. That is, the corresponding capacitance values can be obtained according to the phase values. Wherein, a plurality of the antenna elements 15 are provided to correspond to the varactors 12. In some embodiments, each antenna element 15 corresponds to one or more varactors 12.

In addition, the step 3 is to find out a selective one of the varactor voltage values in response to the required one of the capacitance values of a corresponding one of the varactors 12, which is in relative with each of antenna elements 15 in one or ones of the lookup tables. In other words, after obtaining the required capacitance value for each antenna element 15 (step 2), the varactor voltage values in response to the obtained capacitance value can be found out from the one or more lookup tables.

The step 4 is to provide a voltage signal with the selective varactor voltage value to the corresponding varactor 12, and to enable the antenna elements 15 together to form a wave beam with the characteristic wavefront. In other words, after finding out the varactor voltage value (step 3), the driving unit 14 can provide the required voltage signal (varactor voltage value) to the corresponding varactor 12 (step 4).

In some embodiments, before or after the step of obtaining a plurality of capacitor-voltage characteristic curves of the varactors 12, the beamforming method of an electronic device further includes: providing a plurality of low noise amplifying circuits and power amplifying circuits; wherein each of the low noise amplifying circuits and power amplifying circuits is provided with the power values in response to the varactor voltage values. Wherein, these varactor voltage values and the corresponding power values are recorded in a part of the lookup tables in the memory element 13. In some embodiments, each of the low noise amplifying circuits and power amplifying circuits includes a plurality of signal pins being provided with the power values in response to the varactor voltage values, which are recorded in the lookup tables in the memory element 13.

Here mentioned above are the embodiments relating to the phased array antenna in this disclosure.

In generic comprehension, the lookup tables are capable of recording a plural of voltage values: each of the voltage values is functioned of the varactor voltage, and the varactor voltage is function of the capacitance values. In some case, each of the voltage values is further functioned of either one or both of the low noise amplifying circuits and power amplifying circuits. Rather than the embodiments relating to the phased array antenna, the electronic device could be much diversity, for example, the electronic device could be a metasurface structure or the like, which is implemented without antenna elements 15.

For further description, the electronic device according to another embodiment of this disclosure includes a substrate, a plurality of varactors, one or more memory element, and a driving unit. The material of the substrate is not limited as well. The substrate includes a substrate body, and a conductive pattern electrically connecting with plurality of varactors and the at least one memory element. The configuration and arrangement of the conductive pattern and the varactors is not limited as well. The driving unit includes one or ones of driving elements, which correspond to the varactors, in a predetermined manner, such as a one-on-one manner, a one-on-multiple manner, or a multiple-on-one manner. One or ones memory elements define a plurality of lookup tables, in which each of the lookup table records a plurality of voltage values, in which each of the voltage values is functioned of the varactor voltage, and the varactor voltage is function of the capacitance values of one or ones of the varactors. Based on different input voltage values referenced with the varactor 12 so as to provide various capacitance values.

Based on at least various capacitance values of a respective one of the varactor 12, different input voltage values at least referenced with the varactor is provided. In some case, the different input voltage values referenced with the varactor combined with and functioned of either one or both of the noise amplifying circuit and the power amplifying circuit is also provided. In addition to the reference of varactors, there are no limits on further reference for the voltage values; for example, either one or both of the noise amplifying circuit and the power amplifying circuit could be combined or substituted with other functional elements.

Referring to the following table 2, it is one lookup table obtained based on the voltage values at least referenced with the varactors. Herein, V1~Vn represent different voltage values, and F(VV1)~F(VVn) represent the varactor voltage, and F(VV1)~F(VVn) span furthermore lookup sub-tables. For example, in table 2A, VV1~VVn−1 represent different varactor voltage values, and C1~Cn represent the capacitance values corresponding to the varactor voltage values VV1~VVn, respectively. Each of the voltage values spans its own one or more lookup sub-tables.

TABLE 2

| | |
|---|---|
| V1 | F(VV1) |
| V2 | F(VV2) |
| V3 | F(VV3) |
| . | . |
| . | . |
| . | . |
| Vn-1 | F(VVn-1) |
| Vn | F(VVn) |

TABLE 2A

| | |
|---|---|
| VV1 | C1 |
| VV2 | C2 |
| VV3 | C3 |
| . | . |
| . | . |
| . | . |
| WVn-1 | Cn-1 |
| VVn | Cn |

As mentioned above, based on the above-mentioned beamforming method of an electronic device and an electronic device, this disclosure can improve the offset of the phase angle of wavefront caused by the variations of the capacitor-voltage characteristic curves of different varactors.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. An electronic device, comprising:

a substrate;

a plurality of varactors arranged on the substrate; wherein each of the varactors is defined with a capacitor-voltage characteristic curve, in which each of the varactors is provided with a plurality of capacitance values in response to a plurality of varactor voltage values in a respective manner;

a memory element defined with one or more lookup tables, wherein the capacitance values and the varactor voltage values of the capacitor-voltage characteristic curve are recorded in the lookup table(s);

a driving unit outputting a plurality of voltage signals respectively to the varactors, and each of the voltage signals respectively provided with one of the varactor voltage values; and a plurality of antenna elements arranged on the substrate and electrically connected to the varactors; each of the antenna elements being provided with various phase values in response to the capacitance values of a corresponding one of the varactors;

wherein a selective one of the varactor voltage values in response to the required one of the capacitance values of a corresponding one of the varactors is found out from one or ones of the lookup table(s) and delivered by the driving unit; whereby the antenna elements are together enabled to form a wave beam with a characteristic wavefront in accordance with the capacitance values.

2. The electronic device as claimed in claim 1, wherein the memory element connects to the substrate.

3. The electronic device as claimed in claim 1, further including a plurality of antenna signals traveling through the antenna elements; wherein each of the antenna signals defines a signal frequency, in which a frequency value thereof is equal to or greater than 1 GHz.

4. The electronic device as claimed in claim 1, wherein one or ones of the varactors is a testing varactor, and the testing varactor is provided with ones of the capacitance values in response to various ones of the voltage signals.

5. The electronic device as claimed in claim 1, further including a plurality of low noise amplifying circuits and power amplifying circuits; wherein each of the low noise amplifying circuits and power amplifying circuits is provided with the power values in response to the varactor voltage values, which are recorded in ones of the lookup tables in the memory element.

6. The electronic device as claimed in claim 5, wherein each of the low noise amplifying circuits and power amplifying circuits includes a plurality of signal pins being provided with the power values in response to the varactor voltage values, which are recorded in one or ones of the lookup tables in the memory element.

7. The electronic device as claimed in claim 1, wherein each of the antenna elements corresponds to one or ones of the varactors, each of the antenna elements varies with the phase values in response to the capacitance values of a corresponding one or ones of the varactors.

8. An electronic device, comprising:

a substrate;

a plurality of varactors arranged on the substrate; wherein each of the varactors is provided with a plurality of capacitance values in response to a plurality of varactor voltage values in a respective manner;

a memory element is defined with one or more lookup tables, wherein each of the lookup tables records a plurality of voltage values, in which each of the voltage values is functioned of the varactor voltage, and the varactor voltage is function of the capacitance values; and a driving unit outputting a plurality of voltage signals respectively in response with the voltage values;

wherein a selective one of the voltage values is found out from one or ones of the lookup table(s) and delivered by the driving unit and enables a wave beam with a characteristic wavefront in accordance with the voltage values.

9. The electronic device as claimed in claim 8, wherein the memory element directly connects to the substrate.

10. The electronic device as claimed in claim 8, further including a plurality of antenna elements arranged on the substrate and electrically connected to the varactors, wherein each of the antenna elements being provided with various phase values in response to one of the voltage values, and the selective one of the voltage values is in response to the required one of the phase values of the antenna elements.

11. The electronic device as claimed in claim 10, further defining a plurality of antenna signals traveling through the antenna elements; wherein each of the antenna signals defines a signal frequency, in which a frequency value thereof is equal to or greater than 1 GHz.

12. The electronic device as claimed in claim 8, further including a plurality of low noise amplifying circuits and power amplifying circuits; wherein the voltage values is further functioned of the low noise amplifying circuits and the power amplifying circuits.

* * * * *